United States Patent
Berg et al.

(10) Patent No.: US 7,552,247 B2
(45) Date of Patent: *Jun. 23, 2009

(54) INCREASED COMPUTER PERIPHERAL THROUGHPUT BY USING DATA AVAILABLE WITHHOLDING

(75) Inventors: Thomas B. Berg, Portland, OR (US); Adrian C. Moga, Portland, OR (US); Dale A. Beyer, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/918,888

(22) Filed: Aug. 15, 2004

(65) Prior Publication Data

US 2005/0015520 A1     Jan. 20, 2005

Related U.S. Application Data (63) Continuation of application No. 10/045,798, filed on Jan. 9, 2002, now Pat. No. 6,807,586.

(51) Int. Cl.
G06F 13/00 (2006.01)
G06F 13/14 (2006.01)
G06F 13/38 (2006.01)

(52) U.S. Cl. .............................. 710/20; 710/29; 710/36; 710/40; 710/244; 709/200; 709/213; 709/214; 718/106; 712/216; 712/220; 712/225; 711/141; 711/150; 711/151; 711/168

(58) Field of Classification Search .................. None
See application file for complete search history.

(56) References Cited

U.S. PATENT DOCUMENTS

| 5,450,550 | A | * | 9/1995 | Ito et al. ...................... 712/207 |
| 5,493,669 | A | * | 2/1996 | Denman, Jr. ................. 711/133 |
| 5,537,561 | A | * | 7/1996 | Nakajima ..................... 712/23 |
| 5,881,303 | A | * | 3/1999 | Hagersten et al. ............. 712/30 |
| 6,067,603 | A | * | 5/2000 | Carpenter et al. ........... 711/141 |
| 6,141,733 | A | * | 10/2000 | Arimilli et al. ............... 711/141 |
| 6,385,705 | B1 | * | 5/2002 | Keller et al. ................. 711/154 |
| 6,389,508 | B1 | * | 5/2002 | Tamura ....................... 711/112 |
| 6,587,926 | B2 | * | 7/2003 | Arimilli et al. ............... 711/122 |
| 6,745,272 | B2 | * | 6/2004 | Owen et al. .................. 710/107 |
| 6,751,698 | B1 | * | 6/2004 | Deneroff et al. ............. 710/317 |
| 6,886,048 | B2 | * | 4/2005 | Richard et al. ................. 710/5 |

OTHER PUBLICATIONS

Sarita V. Adve et al., Shared Memory Consistency Models: A Tutorial, Sep. 1995, Western Research Laboratory, pp. 1-28.*

* cited by examiner

*Primary Examiner*—Tanh Q Nguyen
(74) *Attorney, Agent, or Firm*—Steven Lieske Bennett (57) ABSTRACT

A method and apparatus for a multiprocessor system to simultaneously process multiple data write command issued from one or more peripheral component interface (PCI) devices by controlling and limiting notification of invalidated address information issued by one memory controller managing one group of multiprocessors in a plurality of multiprocessor groups. The method and apparatus permits a multiprocessor system to almost completely process a subsequently issued write command from a PCI device or other type of computer peripheral device before a previous write command has been completely processed by the system. The disclosure is particularly applicable to multiprocessor computer systems which utilize non-uniform memory access (NUMA).

4 Claims, 8 Drawing Sheets

INCREASED COMPUTER PERIPHERAL THROUGHPUT BY USING DATA AVAILABLE WITHHOLDING

PARENT PATENT APPLICATION

The present patent application is a continuation of the previously filed patent application entitled "Increased computer peripheral throughput by using data available withholding," filed on Jan. 9, 2002, assigned Ser. No. 10/045,798, and issued as U.S. Pat. No. 6,807,586, which is hereby incorporated by reference.

CROSS-REFERENCE TO RELATED APPLICATIONS

The present patent application is a continuation of and claims the benefit of and priority to the co-assigned U.S. patent application filed on Jan. 9, 2002, and assigned Ser. No. 10/045,798, which has the same inventorship and title as the present patent application.

Furthermore, the following patent applications, all assigned to the assignee of this application, describe related aspects of the arrangement and operation of multiprocessor computer systems according to this invention or its preferred embodiment.

U.S. patent application Ser. No. 10/045,927 by T. B. Berg et al. entitled "Method And Apparatus For Using Global Snooping To Provide Cache Coherence To Distributed Computer Nodes In A Single Coherent System" was filed on Jan. 9, 2002.

U.S. patent application Ser. No. 10/045,564 by S. G. Lloyd el, al. entitled "Transaction Redirection Mechanism For Handling Late Specification Changes And Design Errors" wag filed on Jan. 9, 2002.

U.S. patent application Ser. No. 10/045,797 by T. B. Berg et al. entitled "Method And Apparatus For Multi path Data Storage And Retrieval" was filed on Jan. 9, 2002.

U.S. patent application Ser. No. 10/045,923 by W. A. Downer et al. entitled "Hardware Support For Partitioning A Multiprocessor System To Allow Distinct Operating Systems" was filed on Jan. 9, 2002.

U.S. patent application Ser. No. 10/045,925 by T. B. Berg et al. entitled "Distributed Allocation Of System Hardware Resources For Multiprocessor Systems" was filed on Jan. 9, 2002.

U.S. patent application Ser. No. 10/045,926 by W. A. Downer et al. entitled "Masterless Building Block Binding To Partitions" was filed on Jan. 9, 2002.

U.S. patent application Ser. No. 10/045,774 by W. A. Downer et al. entitled "Building Block Removal From Partitions" was filed on Jan. 9, 2002.

U.S. patent application Ser. No. 10/045,796 by W. A Downer et al. entitled "Masterless Building Block Binding To Partitions Using Identifiers And Indicators" was filed on Jan. 9, 2002.

BACKGROUND OF THE INVENTION

1. Technical Field

The present invention relates generally to computer data cache schemes, and more particularly to a method and apparatus for simultaneously process a series of data writes from a standard peripheral computer interface device when having multiple data processors in a system utilizing non-uniform memory access.

2. Description of the Related Art

In computer system designs utilizing more than one processor operating simultaneously in a coordinated manner, data handling from peripheral component interface (PCI) devices is controlled in a fashion that provides only for single transactions to be processed at one time or in strict order, if multiple data output ads are received from one of the PCI devices in a system utilizing any number of such devices. In a multiprocessor system which uses non-uniform memory access where system memory may be distributed across multiple memory controllers in a single system this may limit performance.

A PCI device, such as a hard disk controller, may issue a write command. Any multiple processor address control system will send a "invalidate" indication of the data line to be written to all caching agents or processors. One method of handling such invalidate's in the past is that a controller waits to receive acknowledgments that the data invalidate has been received and then makes that data line available for writing. The controller then sends an invalidate of a flag line for that data line, which was just made available for write. In the prior art, many such controllers will wait to receive acknowledgments from all memory sources prior to proceeding and then will accept the data from the PCI device attempting to write to memory. After such a device writes to the memory management device, that device makes the flag line available. Usually, controllers found in the prior art post write commands only in the same order as the invalidate commands are issued on a particular PCI bus.

All of this has the effect of slowing down system speed and therefore performance, because of component latency and because the ability of the system to process multiple data lines while waiting for invalidate indicators from other system processors is not fully utilized.

SUMMARY OF THE INVENTION

A first aspect of this invention is a method for controlling the sequencing of data writes from peripheral devices in a multiprocessor computer system. The computer system includes groups of processors, with each processor group interconnected to the other processor groups. In the method, a first data write is issued by a peripheral device in the system, queued, and checked for completion. The sequence order of overlapping write data is tracked. Both the first and the second write data are processed substantially simultaneously using one or more of the memory systems, but the processed second write data is output only after completion of the first data write. By staring the processing of subsequent data writes before completing previous data writes, the method of the invention increases overall performance of the system.

Another aspect of this invention is found in a multiprocessor computer system itself. The system has two or more groups of one or more processors each. The system also has a peripheral device capable of initiating first and second data writes producing first and second write data, respectively, and a queue capable of sequentially ordering the data writes. A completion indicator determines completion of the first data write, and a sequencer tracks overlapping of the write data, both in response at least in part to the write data. The system includes storage for the first and second write data, and output for the first and second write data which responds at least in part to the sequencer and the completion indicator. The storage for the second write data is capable of accepting the second write data before completion of the first data write, but the output for the second write data is capable of outputting the second write data only after completion of the first data write.

Other features and advantages of this invention will become a from the following detailed description of the presently preferred embodiment of the invention, taken in conjunction with the accompanying drawings.

DETAILED DESCRIPTION OF THE PREFERRED EMBODIMENT

Overview

The preferred embodiment of this invention allows data being issued from peripheral component interface (PCI) devices or other computer peripheral components to be almost simultaneously processed in a parallel fashion without distortion of the data transaction timing sequence in multiple microprocessor computer. A PCI device can write two cache data lines, the fist cache line being called "data" and the second line being called a "flag". A memory control device for a group of processors receives these two cache line write transactions from a PCI bridge device interfacing between the PCI peripheral and the control system. The control system issues a write command, but the control system does not process subsequent transactions at that time.

The control system looks up the state of the data cache line and issues invalidates to any processors in the system that hold a copy of that data line. At the same time the control system signals other similar control systems a id with all other groups of processors that the invalidates have been issued. The various control systems each associated with a group of processors invalidates the data line in the processor's cache on that particular group of processors. Such controllers send an "acknowledge" command back to the original controller indicating that they have invalidated the per line in response to the original controller's request.

Overall performance of the computer system is improved because the system handles the data for the "data" cache line but does not make that data line visible to the rest of the system controllers. As soon as the "data" has been moved into the central memory cache system, the controller signals a particular PCI bridge chip that it has completed the write and has deallocated the buffer space so that it can receive more transactions. Once the originating controller has received the indication from the central controller (comprised of a tag and address crossbar), that the invalidates will eventually be issued, the "write flag" transaction can now proceed with the above steps of: issuing the "write flag" command to the central controller, having the central controller look up the states and issue invalidates, and having the other controllers invalidate their processors and sending "acknowledge" commands to the original controller. The originating controller will receive acknowledges from both the "data" and "flag" lines.

Acknowledges of invalidates can thus be received in any order. For example, the acknowledges for the flag may be received before or after the acknowledges for the data without corruption of the ordering sequence. The invention ensures that the "data" line is made visible to the rest of the system only after all acknowledges for "data" line have been received. The invention also ensures that the "flag" line is made visible after both the "data" has been made visible and all acknowledges for the "flag" have been received.

Technical Details

The present invention relates specifically to an improved data handling method for use in a multiple processor system which utilizes a tagging and address crossbar system for use in combination with a data crossbar so together comprising a data processing to process multiple data write requests concurrently while maintaining the correct order of the write requests. The system maintains transaction ordering from a given PCI Bus throughout an entire system which employs multiple processors all of which may have access to a particular PCI Bus. The described invention is particularly useful in non-uniform memory access (NUMA) multi-processor systems. NUMA systems partition physical memory associated with one local group of microprocessors into locally available memory (home memory) and remote memory or cache for use by processors in other processor groups within a system. In such systems, apparatus which coordinates peripheral component interface (PCI) devices to control ordering rules for processing write commands must coordinate data transfer to prevent overwriting or out of sequence data forward. Namely, a series of write commands from a PCI device must be made visible to the system in the precise order that they were issued by the PCI device. Some tag and address crossbar systems used in multiple processor systems cannot allow a line of data to be made visible to the system until that line has been invalidated (i.e., an "invalidate" has been issued) thus insuring that no processor in the system has access to that line. This has the effect of limiting the processing speed of the system.

Figure 5:
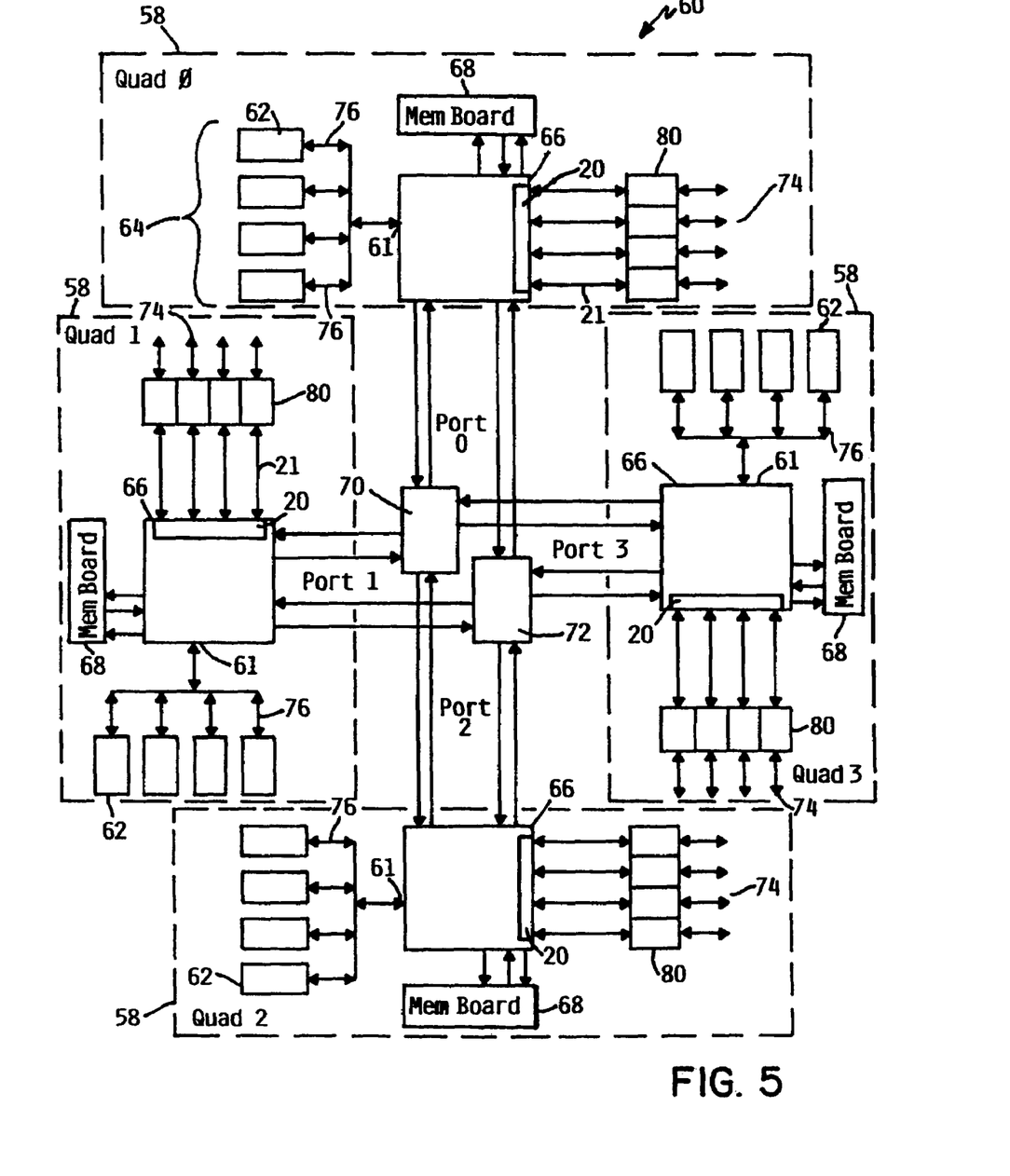
FIG. 5 is a block diagram of a multiprocessor system having a tag and address crossbar and a data crossbar, and incorporating the inbound data block of FIG. 1.

FIG. 5 presents an example of a typical multiprocessor systems in which the present invention may be used. FIG. 5 illusions a multi-processor system which utilizes four separate central control systems (control agents) 66, each of which provides input/output interfacing and memory control for an array 64 of four Intel brand Itanium class microprocessors 62 per control agent 66. In many applications, control agent 66 is an application specific integrated circuit (ASIC) which is developed for a particular system application to provide the interfacing for each microprocessors bus 76, each memory 68 associated with a given control agent 66, F16 bus 21, and PCI input/output interface 80, along with the associated PCI bus 74 which connects to various PCI devices.

FIG. 5 also illustrates the port connection between each tag and address crossbar 70 as well as data crossbar 72. As can be appreciated from the block diagram shown in FIG. 5, crossbar 70 and crossbar 72 allow communications between each control agent 66, such tat addressing information and data information can be communicated across the entire multiprocessor system 60. Such memory addressing system is necessary to communicate data locations across the system and facilitate update of control agent 66 cache information regarding data validity and required data location.

A single quad processor group 58 is comprised of microprocessors 62, memory 68, and control agent 66. In multiprocessor systems to which the present invention relates, quad memory 68 is usually random access memory (RAM) available to the local control agent 66 as local or home memory. A particular memory 68 is attached to a particular controller agent 66 in the entire system 60, but is considered remote memory when accessed by another quad or control agent 66 not dirty connected to a particular memory 68 associated with a particular control agent 66. A microprocessor 62 existing in any one quad processor group 58 may access memory 68 on any other quad processor group 58. NUMA systems typically partition memory 68 into local memory and remote memory for access by other quads processor groups 58. The present invention enhances the entire system's ability to keep track of data writes issued by PCI devices that access memory 68 which is located in a processor group 58 different from and therefore remote from, a processor group 58 which has a PCI device which issued the write.

Figure 6:
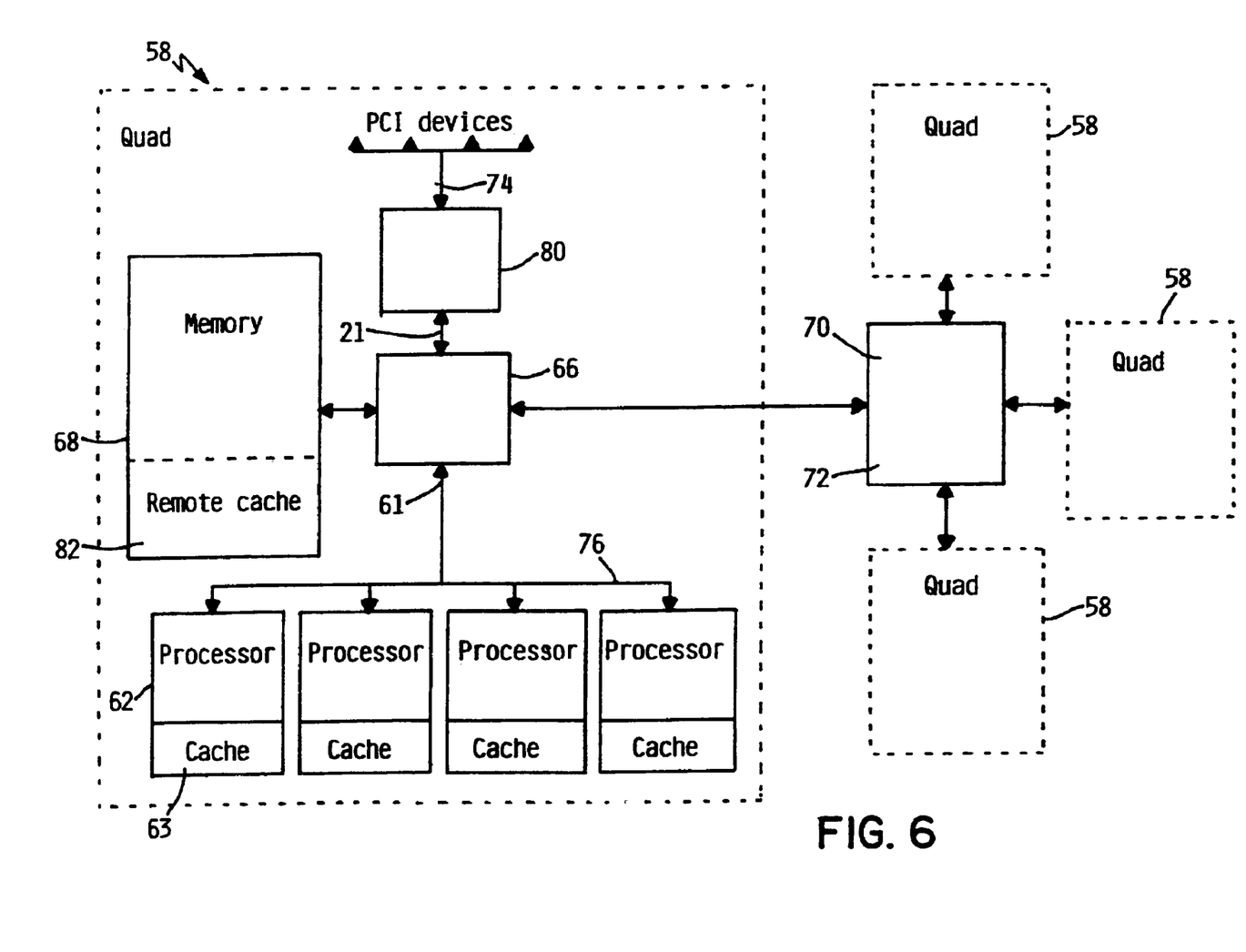
FIG. 6 is a block diagram of one quad processor group of the system of FIG. 5.

The present invention permits a system using multiple processors with a processor group interface control system and an address tag and crossbar system to almost completely process subsequent PCI device issued writes before previous writes from such PCI devices have been completely processed by the system. The present invention provides for a method in which invalidates for a second write can be issued in parallel with the invalidates for a first write being issued by a given PCI device. The invention ensures that the second write is not visible to the system, that is that no processor on a multiprocessor board can read the data from the second write, until the invalidates from the first write has been received. In the preferred embodiment multiple writes issued sequentially by a PCI device may be processed in parallel and out of sequence with the order in which the writes were issued while insuring that the output sequence of the writes remain identical to the order of the input writes. FIG. 6 is a different view of the same multiprocessor system shown in FIG. 5 in a simpler view, illustrating one processor group 58, sometimes referred to as a Quad, in relation to the other Quad 58 components as well as crossbar system 70 and 72 illustrated for simplicity as one unit in FIG. 6.

Figure 1:
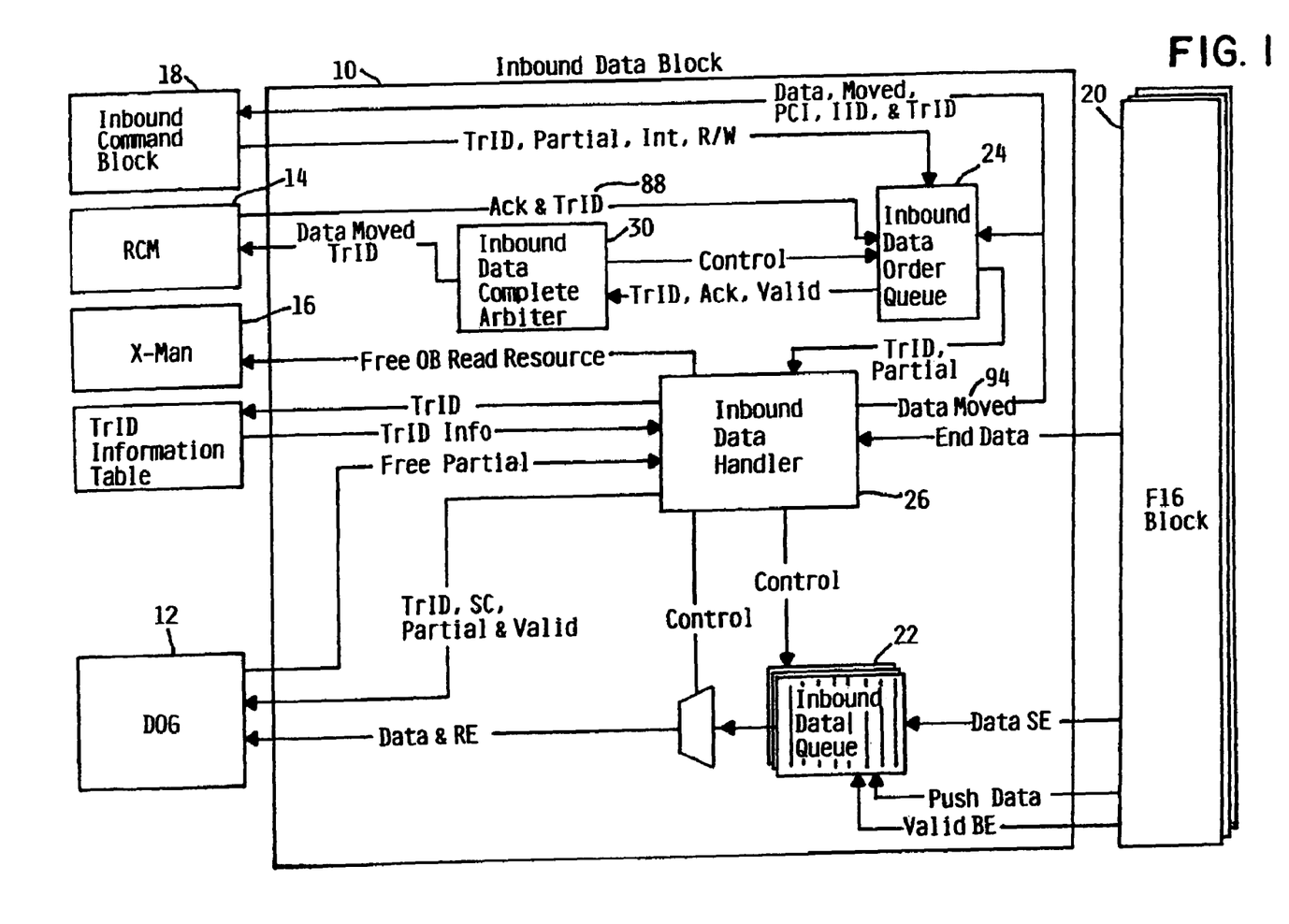
FIG. 1 is a functional block diagram of the inbound data block which buffers data from the PCI bus according to the preferred embodiment of the invention.

Turning now to FIG. 1, the invention will be described with reference to the functional block diagram for the inbound data block. Inbound data block (IDB) 10 interfaces with data organizer (DOG) 12, request completion manage (RCM) 14, transaction manager (X-MAN) 16, inbound command block (ICB) 18, and the F16 interface block 20. IDB 10 buffers the data from F16 bus 21 to the DOG 12. IDB 10 is also possible for maintaining the data ordering to allow the posting of inbound transactions from the PCI bus 74 being generated by a PCI device and delivered from each PCI input-output interface 80. F16 interface block 20 represents an initial interface inside control agent 66 to the group of four F16 bus 21. Block 20, which is associated with each F16 bus 21, pushes data into the inbound data queue (IDQ) 22 as it arrives from an individual F16 bus 21. In the preferred embodiment of the present invention, F16 bus 21 is comprised of a proprietary design utilized by the Intel brand of microprocessors and associated microprocessor chip sets which is known commonly as the Intel F16 bus. As can be seen in FIG. 5, F16 bus 21 acts as a bridging bus between control agent 66 and PCI input/output (IO) induce 80 which can connect a particular PCI device to the system. The invention presently described may be applied to other types of data interfaces which issue data sequentially for use by a processor system. Though the preferred embodiment is scribed utilizing an Intel brand PCI bridge chip set, it should be appreciated that other device interfaces utilizing other component bus interface systems which interconnect system devices, such as disk drives, video cards or other peripheral components may be utilized in carrying out the system described herein. Each individual quad control agent 66 utilizes four of such PCI bus 74 connected through PCI bridge chips 80 which are in turn connected to the F16 interface block 20 contained within each individual control agent 66 via the F16 bus 21. The four F16 buses 21 operate in a parallel fashion and simultaneously as illustrated in FIG. 5.

Each microprocessor 62 communicates to the rest of the system through its individual processor bus 76, which communicates with its respective control agent 66, especially in the preferred embodiment wherein each group 64 of four Itanium microprocessors 62 are also connected in a larger array comprised of four quads 58 of like processor arrays as depicted in FIG. 5. The Itanium microprocessor used in the preferred embodiment is a device manufactured by Intel.

RCM 14 acts as the control responsible for tracking the progress of all incoming transactions initiated by the PCI bus 74 and scheduling and dispatching the appropriate data responses. RCM 14 controls the data sequence and steering through DOG 12 and streamlines the data flow through the data crossbar system used to connect multiple processor groups in either a single quad or multiple quad processor system configurations. DOG 12 provides data sage and routing between each of the major interface modules shown in FIG. 1. The heart of DOG 12 is a data buffer in which up to 64 cache lines of data can be stored. Surrounding the storage area is logic hardware that provides for no-wait writes into and low latency reads out of the data buffer within DOG 12.

Continuing with FIG. 1, when all inbound data from the F16 interface block 20 has been moved, the inbound command block 18 also schedules the transaction in the inbound data order queue (IDOQ) 24. IDOQ 24 makes the transaction available to the inbound data handler (IDH) 26 for data movement. IDOQ 24 is responsible for keeping the proper order of all data flowing from given F16 bus 21 to a given control agent 66. Specifically, IDOQ 24 tacks and maintains the order of all inbound writes to memory 68, inbound responses to outbound reads when processor 62 reads data on a PCI device, and inbound interrupts in the system. In system 60, the control agents 66 must track the order of all inbound data, whether a PCI device write or other data. IDOQ 24 keeps track of such data to maintain information regarding the order of any data. IDH 26 schedules the transaction and moves the data from IDQ 22 to DOG 12. After the data has moved, IDOQ 24 is notified and the resources used by the transaction are freed to either the transaction manager 16 or the outbound com block (not shown).

If the transaction being handled was a cacheable write, when RCM 14 will signal that all of the invalidations have been collected. Once all of the ordering requirements have been met, the inbound data complete arbiter 30 will signal RCM 14 that the transaction is complete and the data is available to DOG 12. If the transaction being processed is a cacheable partial write, then IDH 26 will signal DOG 12 to place the transaction in a cacheable partial write queue where it awaits the background data.

Figure 2:
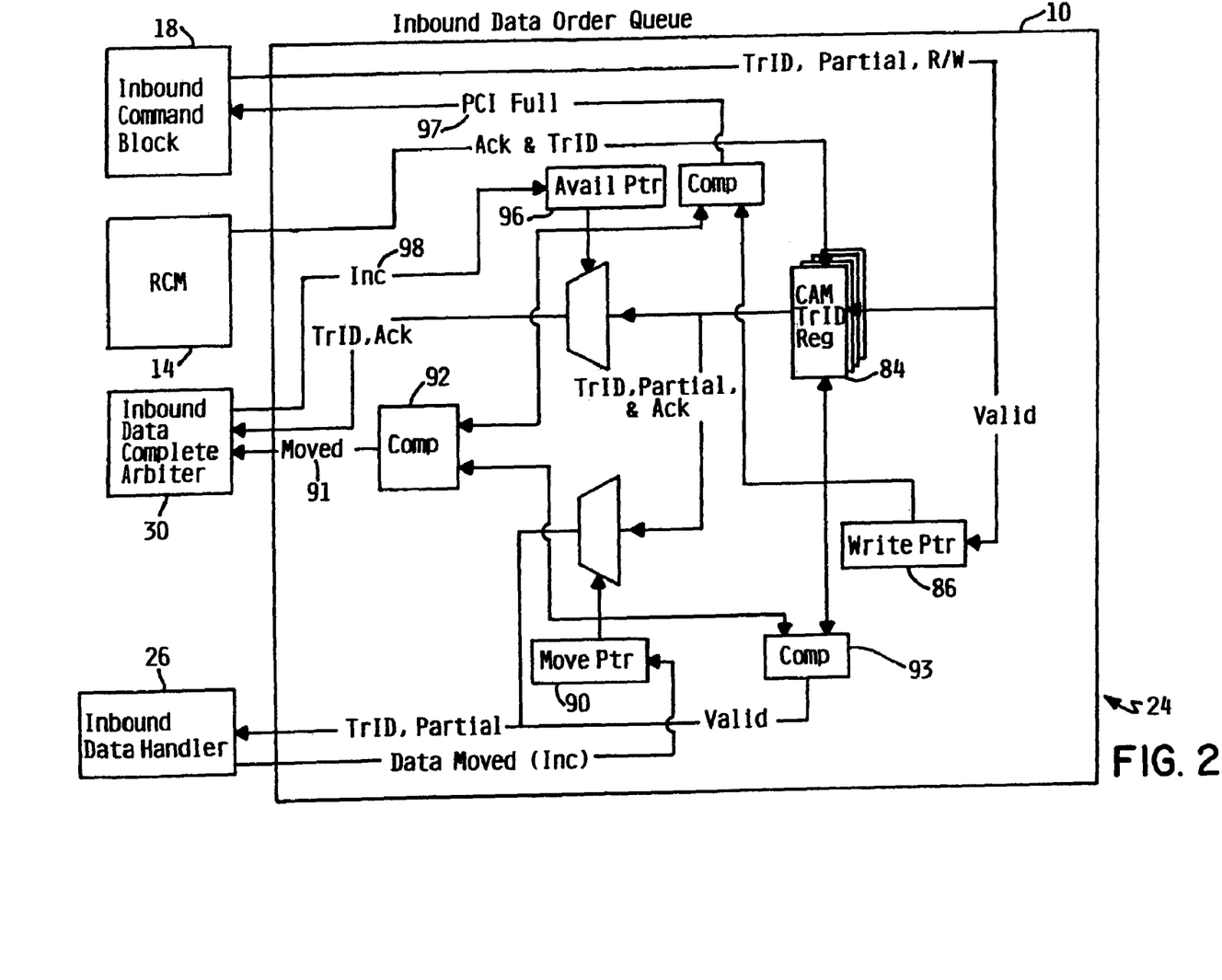
FIG. 2 is a functional block diagram of the inbound data order queue of FIG. 1, and is suggested for printing on the first page of the issued patent.

Turning now to FIG. 2, Inbound Data Order Queue 24 is presented in operational terms. IDOQ 24 has four main interfaces as shown in FIG. 2. Those interfaces are the Inbound Command Block (ICB) 18, the Response Completion Manager (RCM) 14, the Inbound Data Completion Arbiter (IDCA) 30 and the Inbound Data Handler (IDH) 26.

When a write operation is issued form F16 bus 21, it enters ICB 18 through F16 interface block 20. ICB 18 presents the write request to transaction manager 16, which is located within control agent 66, routes the write request to a bus within control agent 66 connected to tag and address crossbar 70 as more fully illustrated in FIG. 5. Tag and address crossbar 70 receives the write operations, looks up tag information for the corresponding address of the data and determines which agent 66 in quad processor system 60 must receive an invalidate operation. As tag and address crossbar 70 issue an invalidate to other control agents 66, tag and address crossbar 70 also issues a reply to the requesting agent 66 which indicates how many acknowledgments it should receive. Further, tag and address crossbar 70 also signals the requesting control agent 66 if it must also issue an invalidate operation on a processor bus 76 connected to that control agent 66. In the event that the effected control agent 66 must issue an invalidate operation, such operation is like any other invalidate or acknowledge pair command. Tag and address crossbar 70 provides a reply as indicated above, the transaction involved is moved from ICB 18 to IDOQ 24. At this point, IDOQ 24 begins to track the order and location of the particular data being read from the PCI bus 21.

In the event of an outbound read event ICB 18 receives a data response from F16 bus 21 through F16 interface block 20 for a previously issued outbound read, for example, if a processor is reading from a PCI card, and ICB 18 does not give the command to transaction manage 16. Instead, ICB 18 forwards the command directly into IDOQ 24 as more fully described below.

When tag and address crossbar 70 has given a reply to a new inbound data operation, ICB 18 asserts a valid signal along with other information regarding that particular new inbound data. Such additional information which is tracked includes the transaction identification (TrID) for the transaction; whether the transaction is an inbound write request or a response to an outbound read or an interrupt; whether the data is a full cache line or just a partial line of data; and if the operation involves a par line of data, which part of the cache line to which the data is associated.

As ICB 18 forwards the operation to IDOQ 24, as shown in FIG. 1, other logic is moving corresponding data into IDQ 22. IDQ 22 functions as a true first-in/first-out (FIFO), so that the order of TrID's given from ICB 18 to IDOQ 24 must match the order of data loaded into IDQ 22.

When IDOQ 24 receives a new operation from ICB 18, such information as described above is loaded into a register within IDOQ 24, shown more particulary in FIG. 2 as CAM TrID register 84. In the preferred embodiment, there are eight queue locations in the register. The register location which is loaded is the location pointed to write pointer 86 in FIG. 2. For example, if pointer 86 has a value of 3, then IDOQ 24's register 3 is loaded. Once such an operation is written to the register, write pointer 86 is incremented so that the next operation would go to the next queue location in turn. If write pointer 86 is a value of 7 and is then incremented, it rolls over and begins at again. It will be appreciated by those skilled in the art that using point in this manner is a known method used for imp queues in a variety of different queuing operations or procedures.

When all of the acknowledgments have been received for a particular write operation, RCM 14 asserts an (ACK) signal and provides a corresponding transaction identification (TrID), shown at 88 in FIG. 1. IDOQ 24 recognizes the ACK signal provided by RCM 14 and then simultaneously comprises the ACK and TrID 88 to each TrID in the registers within the IDOQ 24. The logic in IDOQ 24 then sets the corresponding ACK DONE data bit with the register within IDOQ 24 that contains the TrID that matches the information in the ACK TrID 88.

Continuing with FIG. 2, the functional interface between IDOQ 24 and Inbound Data Handler (IDH) 26 will be described. IDOQ 24 supplies information to IDH 26 corresponding to the next data line to be moved from the IDQ 22 to the DOG 12. IDOQ 24 passes on such information it receives from ICB 18 for a given transaction, specifically those items described above rending pertinent information about a valid transaction asserted by ICB 18. IDH 26 does not differentiate whether such an operation is either a read or a write. Using the information described above regarding the data, IDH 26 controls a transfer of data from IDQ 22 to DOG 12 appropriately.

In accordance with the description above, IDOQ 24 must provide the TrIDs of IDH 26 in the same order as such transaction identifications were received from ICB 18, as data was loaded into IDH 26 in the same order and must be called up from IDH 26 in the correct order. To implement the ordering, IDOQ 24 utilizes a move pointer 90, shown in FIG. 2. As the present system is initialized or reset, move pointer 90 as well as write pointer 86 are set to an initial value of zero. When IDOQ 24 is loaded by ICB 18, write pointer 86 is incremented as earlier described. When the value of write pointer 86 is not equal to the value of move pointer 90, IDOQ 24 is signaled that there is data to be moved and thereby asserts a valid signal to IDH 26. In the event that the value of write pointer 86 and the value of move pointer 90 are not equal, as can be seen in FIG. 2, the compare block 93 asserts a valid signal when such values are not equal. IDOQ 24 also supplies information from the IDOQ 24 registers which are being identified by write pointer 86.

Once data has been moved from IDQ 22 to DOG 12, IDH 26 signals IDOQ 24 by asserting a data moved signal shown at 94. When this occur, move pointer 90 is incremented to the next value. If there are no more valid entries in IDOQ 24, move pointer 90 will be equal to write pointer 86 and the valid signal will be un-asserted. In the event that there is another entry in IDOQ 24, write pointer 86 and move pointer 90 will not be equal and thus IDOQ 24 will maintain a valid condition and supply the TrID corresponding to the next IDOQ 84 register. Continuing to consider FIG. 2, IDOQ 24 is also operatively connected to inbound data completion arbiter (IDCA) 30. The operational connection described in FIG. 2 allows IDCA 30 to provide an indication that data for a particular TrID is available to be read by another transaction. This available transaction must only be read, for a given TrID, once its data has been moved into DOG 12 and, if the transaction being considered was a write, IDOQ 24 must have also received an acknowledged done (ACK-DONE) indication for that TrID. The order of the TrID's given to IDCA 30 must be the same order as the TrID supplied originally by ICB 18. There is a separate IDOQ 24 for each F16 bus 21, each IDOQ 24 handling data from separate PCI buses. Inbound Data Complete Arbiter 30 is responsible for looking at the data item at the head of each IDOQ 24, determining which if any of each data item can be sent to the RCM 14. IDCA 30 selects from the output of various IDOQ 24's which may be producing data simultaneously. IDCA 30 determines when each IDOQ 24 can send data to RCM.

Continuing to consider FIG. 2, available pointer 96 always points to the top available position of the queue. Once pointer 96 is incremented past a particular data entry in the queue, that entry is not considered valid. IDOQ 24 supplies IDCA 30 with information regarding the value at the top of the queue. Such value is the value entered in the IDOQ 24 register which is currently selected by available pointer 96. IDOQ 24 provides the TrID, such TrID's ACK DONE bit as described above, and determines whether the data has been moved by considering the move signal output 91 from compare block 92 shown in FIG. 2. The IDCA 30 will then assert a signal to RCM 14 (also shown as connection between IDCA 30 and RCM 14 in FIG. 1) for a given TrID. Once that TrID is supplied by IDOQ 24 and when both the ACK and moved signals are asserted, if the operation is a read, or an interrupt as opposed to a write operation, the ACK DONE bit will automatically be set so that IDCA 30 will only wait for the data to be moved for that operation.

Once the ACK and moved signal 91 are both asserted for a given TrID, IDCA 30 signals RCM 14 that another transaction can read the corresponding data. Also at this time, IDCA 30 signals that available pointer 96 should be incremented by transmission of the increment signal 98 shown in FIG. 2. Signal 98 increments the available pointer 96 to the next entry available in IDOQ 24. Move signal 91 is asserted if available pointer 96 is not equal to move pointer 90. It can appreciated that compare block 92 produces move signal 91 if available pointer 96 is not equal to pointer 90.

When move signal 91 is issued, data for the TrID at the top of the IDOQ 24 to which available pointer 96 has incremented has been moved into DOG 12. However, the affected TrID has not been given to RCM 14 through IDCA 30 at that time. Once IDCA 30 has given the TrID to RCM 14, available pointer 96 is incremented and that operation is no longer considered in IDOQ 24.

It should be noted in the event that all of the registers in IDOQ 24 are full, (the IDOQ 24 in the preferred embodiment having 8 registers), and if all such registers have valid TrIDs, IDOQ 24 asserts a PCI full signal 97 shown in FIG. 2. In this condition, signal 97 indicates to ICB 18 that the IDOQ 24 cannot handle anymore requests and therefore must not issue any more operations to IDOQ 24 until a register is available. For inbound writes, once the TrID is into IDOQ 24, and the data is moved into IDQ 22, control agent 66 issues a response back to PCI input/output interface 80 that the PCI device can send more operations even though the previous writes are not complete.

Figure 3:
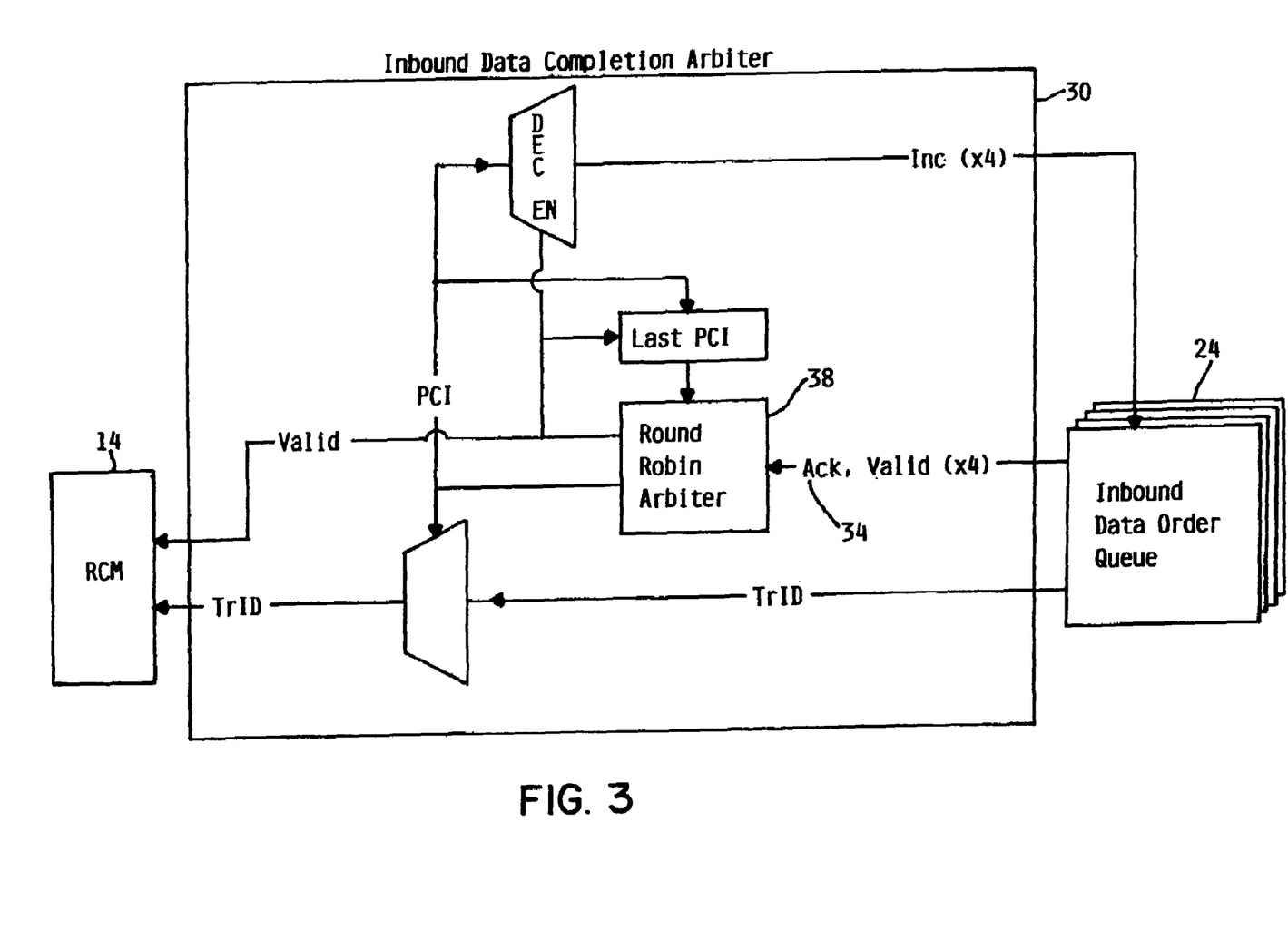
FIG. 3 is a functional block diagram of the inbound data completion arbiter of FIG. 1.

Turning now to FIG. 3, the inbound data completion arbiter 30 will be described. When the transaction is both Valid and Acknowledged 34, then it enters arbitration for signaling to the RCM 14. The winner of this arbitration process is signaled to the RCM 14, and the corresponding IDOQ 24 is notified that the transaction has completed. The last PCI register indicates which of the IODQ 24 has most recently won arbitration in the above process, and is used by Round Robin Arbiter 38.

Inbound Data Queue 22 is a memory that stores the inbound data and byte enables from either a write request or a read completion from F16 interface block 20. IDQ 22 is physically corned of memory storing the byte enables, and two memories storing the data associated with a 128 bit line of data with a 16 bit Error Correction Code (ECC) element attached. It should be understood that when reference is made to a 128 bit line of data, a 128 bit data word with 16 bit ECC is included. Data is written to the IDQ 22, one data word of 64 bits plus 8 bits of ECC at a time and is primly aligned with the 128 bit line of data by F16 block 20. IDQ 22 is protected by ECC Codes for the data and by panty for the byte enables. The ECC is generated by F16 interface block 20 and checked by the DOG 12 while the parity of the data is checked locally.

Figure 4A:
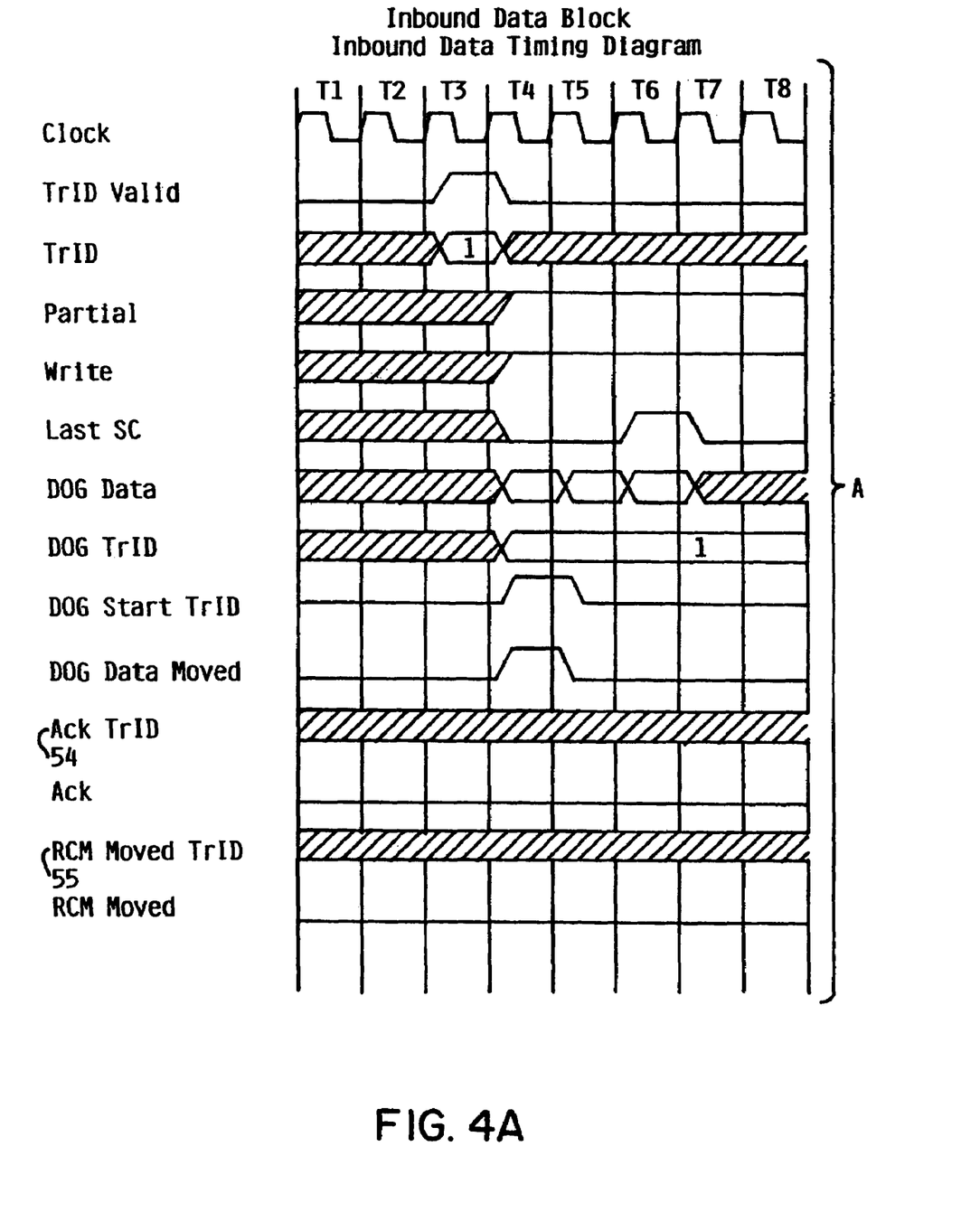
FIG. 4A-4C is a logic timing diagram illustrating the inbound data timing sequence during operation of the preferred embodiment.
Figure 4B:
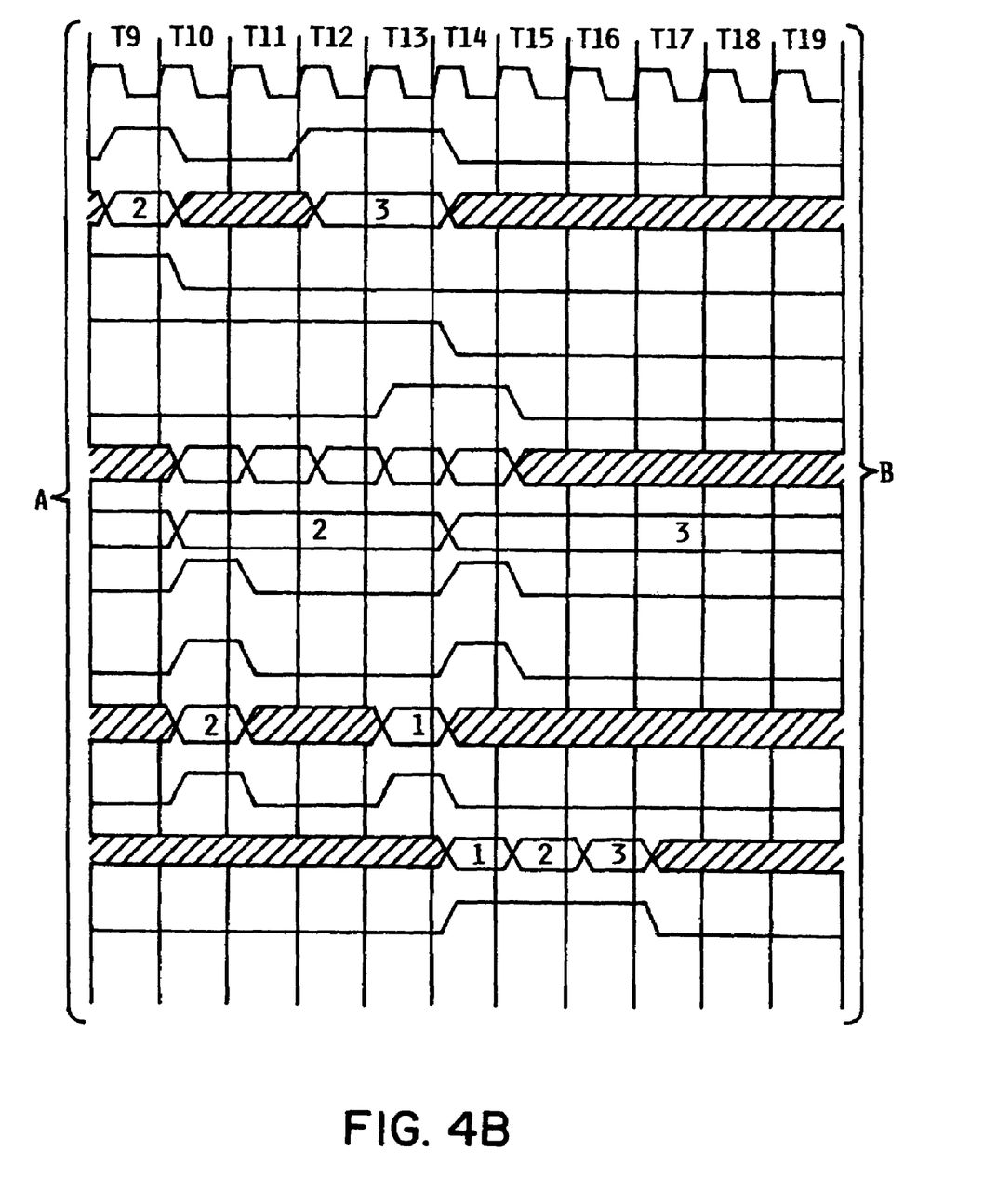
Figure 4C:
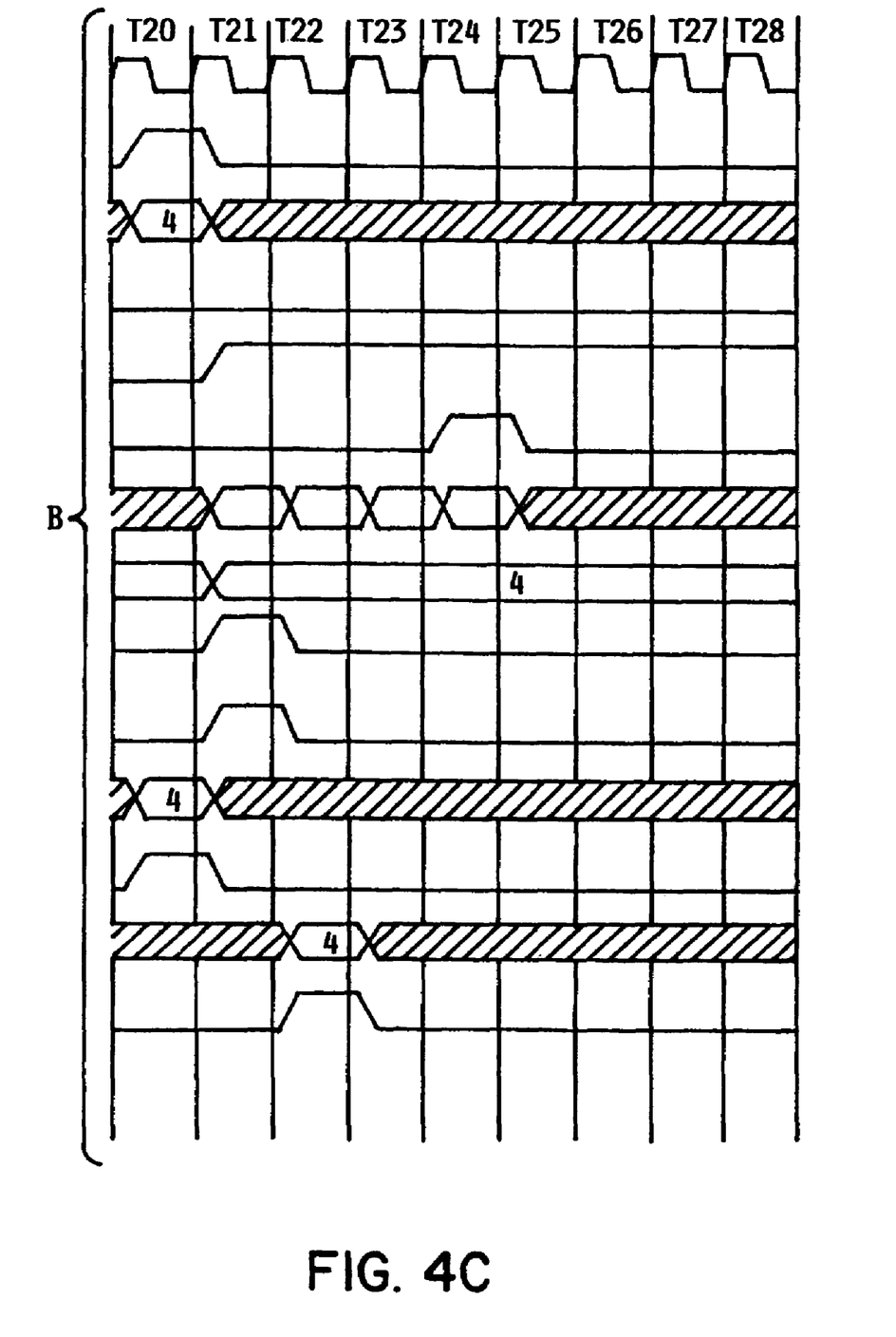

Turning to FIG. 4, (presented in three parts as FIGS. 4A, 4B and 4C for clarity but representing one diagram), an Inbound Data Timing for the IDB 10 illustrating both a partial and full cache line write request is shown. FIG. 4 illustrates the timing sequence of both a partial and a full cache line write request for the entire Inbound Data Block 10. IDOQ 24 is maintaining the order of the data transfers. The transactions have the invalidates collected in the order two, one, and four, shown at ACK TrID 54, but the original data order is maintain as shown in the RCM moved TrID timing line 55 in FIG. 4. RCM 14 is not notified of the transaction two's data movement until transaction one has had the invalidates collected. Transaction three in FIG. 4 was a read transaction and therefore does not require an acknowledgment for signaling the RCM 14. Finally, transaction four in the FIG. 4 Timing Diagram is not signaled to the RCM 14 until the data has been moved, since the acknowledgment was signaled a few clock cycles before it started to transfer.

Advantages

The preferred embodiment improves the logical sequencing of data writes of PCI devices in a multiprocessor system having a plurality of memory systems, each memory system associated with at least one processor but using a common data cache system and control system for all of the processors. The method described provides for overlapping data write processing so that pressing of substituent write commands issued by a PCI device can begin prior to the completion of previous write commands issued by a PCI device without corrupting the original transaction order required to maintain fidelity of the transaction timing. This overlapping results in increased system performance by increasing the number of transactions that can be processed in a given period.

Alternatives

The invention can be employed in any multiprocessor system that utilizes a central control agent for a group of microprocessors, although it is most beneficial when used in conjunction with a tagging and address crossbar system along with a data crossbar system which attaches multiple groups of processors employing non-uniform memory access and divided or distributed memory across the system.

The particular systems and method which allows parallel processing of sequentially issued PCI device write commands through the device bus in a multiprocessor system as shown and described in detail is filly capable of obtaining the objectives of the invention. However, it should be understood that the described embodiment is merely an example of the present invention, and as such, is representative of subject matter which is broadly contemplated by the present invention.

For example, the present invention is disclosed in the context of a particular system which utilizes 16 processors, comprised of four separate groups of four with each group of four assigned to a memory control agent which interfaces the PCI devices, memory boards allocated to the group of four processors, and for which the present invention functions to communicate through other subsystems to like controllers in the other three groups of four disclosed. Nevertheless, the present invention may be used with any system having multiple processors, with separate memory control agents assigned to control each separate group of multiprocessors when each group of processors requires coherence or coordination in handling data read or write commands for multiple peripheral devices utilizing various interface protocols for sequentially issued data writes from other device standards, such as ISA, EISA or AGP peripherals.

The system is not necessarily limited to the specific numbers of processors or the array of processors disclosed, but may be used in similar system design using in interconnected memory control systems with tagging, address crossbar and data crossbar systems to communicate between the controllers to implement the present invention. Accordingly, the scope of the present invention fully encompasses other embodiments which may become to those skilled in the art, and is to be limited only by the claims which follow.

We claim:

1. Apparatus for maintaining ordering of transaction data in relation to completion of transactions while the transaction data are processed, the transaction data being issued from at least one peripheral computer device which issues the transactions, the transactions being associated with multiple processor systems, the multiple processor systems together utilizing at least two processors associated with a computer memory system, the apparatus comprising:
    memory control means operatively connected to each of said processors, the computer memory system and the at least one peripheral computer devices;
    queuing means for queuing a first data write transaction issued by the at least one peripheral computer devices;
    tagging means for determining whether the first data write transaction is complete, for tracking a sequence order of the first data write transaction relative to a second data write transaction also queued by the queuing means, for causing second write data associated with the second data write transaction to be processed and first write data associated with the first data write transaction to be processed using the memory control means; and,
    means for outputting the first write data as has been processed, and then thereafter for outputting the second write data as has been processed only upon completion of the first data write transaction,
    wherein the second write data is processed before with the first write data while still ensuring that the second write data is output in correct order in relation to the first write data,
    wherein one or more invalidates for the first data write transaction are issued in parallel with one or more invalidates for the second data write transaction, and
    wherein the second data write transaction is not visible until the invalidates for the first data write transaction have been received.

2. The apparatus of claim 1, wherein the memory control means is a first memory control means, the apparatus further comprising:
    a second memory control means operatively connected to each of said processors, the computer memory system, and the at least one peripheral computer device;
    address crossbar means for interfacing between the first memory control means and the second memory control means; and,
    data crossbar for interfacing between the first memory control means and the second memory control means.

3. An apparatus for maintaining ordering of transaction data in relation to completion of transactions while the transaction data are processed, the transaction data being issued from at least one peripheral computer device which issues the transactions, the transactions being associated with multiple processor systems, the multiple processor systems together utilizing at least two processors associated with a computer memory system, the apparatus comprising:
    a memory controlling mechanism operatively connected to each of the processors, the computer memory system, and the at least one peripheral computer device;
    a queue to queue a first data write transaction issued by the peripheral computer devices;
    a tagging mechanism to determine whether the first data write transaction is complete, to track a sequence order of the first data write transaction relative to a second data write transaction also queued by the queue, to cause second write data associated with the second data write transaction to be processed and first write data associated with the first data write transaction to be processed using the memory controlling mechanism; and,
    an outputting mechanism to output the first write data as has been processed, and then thereafter to output the second write data as has been processed only upon completion of the first data write transaction,
    wherein the second write data is processed before with the first write data while still ensuring that the second write data is output in correct order in relation to the first write data,
    wherein one or more invalidates for the first data write transaction are issued in parallel with one or more invalidates for the second data write transaction, and
    wherein the second data write transaction is not visible until the invalidates for the first data write transaction have been received.

4. The apparatus of claim 3, wherein the memory controlling mechanism is a first memory controlling mechanism, the apparatus further comprising:
    a second memory controlling mechanism operatively connected to each of the processors, the computer memory system, and the at least one peripheral computer device;
    an address crossbar for interfacing between the first memory controlling mechanism and the second memory controlling mechanism; and,
    data crossbar for interfacing between the first memory controlling mechanism and the second memory controlling mechanism.

* * * * *